(12) United States Patent
Gingras et al.

(10) Patent No.: US 6,790,007 B2
(45) Date of Patent: Sep. 14, 2004

(54) WIND TURBINE STRUCTURE

(76) Inventors: Mitch Gingras, 180 Lees Avenue, Ottawa, Ontario (CA), K1S 5J6; Simon Giasson, 227 Chemin Mercier, St. Elzear, Quebec (CA), G0C 2W0; Michel Lauriault, 3525 Beckstead Road, Chesterville, Ontario (CA), K0C 1H0

( * ) Notice: Subject to any disclaimer, the term of this patent is extended or adjusted under 35 U.S.C. 154(b) by 187 days.

(21) Appl. No.: 10/234,331

(22) Filed: Sep. 5, 2002

(65) Prior Publication Data

US 2003/0042743 A1 Mar. 6, 2003

(30) Foreign Application Priority Data

Sep. 6, 2001 (CA) .............................. 2357095

(51) Int. Cl.[7] .................................. F03O 3/06
(52) U.S. Cl. ................. 416/183; 416/182; 416/223 R; 416/237; 415/4.4
(58) Field of Search ................ 415/4.2, 4.4, 907; 416/223 R, 235, 237, 179, 182, 183, 185

(56) References Cited

U.S. PATENT DOCUMENTS

| | | | | |
|---|---|---|---|---|
| 1,002,833 A | * | 9/1911 | Giddings | ............... 415/4.4 |
| 1,835,018 A | | 12/1931 | Darriieus | |
| 1,961,237 A | * | 6/1934 | Mobley | ............... 416/185 |
| 4,017,205 A | | 4/1977 | Bolie | |
| 4,018,535 A | | 4/1977 | Cason, III | |
| 4,036,916 A | | 7/1977 | Agsten | |
| 4,088,419 A | | 5/1978 | Hope et al. | |
| 4,116,581 A | | 9/1978 | Bolie | |
| 4,156,580 A | | 5/1979 | Pohl | |
| 4,365,929 A | | 12/1982 | Retz | |
| 4,377,373 A | * | 3/1983 | Westerhausen | ............... 416/237 |
| 6,224,338 B1 | * | 5/2001 | Christaldi | ............... 416/223 R |

FOREIGN PATENT DOCUMENTS

| | | | |
|---|---|---|---|
| CA | 1151072 | 2/1983 | |
| EP | 0 015 131 | 3/1980 | |
| FR | 2 588 317 | 10/1987 | |
| JP | 08-232 831 | 10/1996 | |
| SU | 1724923 A1 * | 4/1992 | ............... 416/235 |
| WO | WO 97/39240 | 5/2000 | |

* cited by examiner

Primary Examiner—Christopher Verdier
(74) Attorney, Agent, or Firm—Robert A. Wilkes; Shapiro Cohen

(57) ABSTRACT

A vertical axis wind turbine including a wind turbine which depends on a vortex down wind of the turbine enhancing the air flow past the vertical turbine. The vertical axis wind turbine structure includes a rectangular shaped turbine with four orbiting panels mounted to rotate at the top of a pyramidal base structure which generates a substantially horizontal vortex immediately down wind of the turbine, thus enhancing the air flow past the turbine.

6 Claims, 3 Drawing Sheets

WIND TURBINE STRUCTURE

FIELD OF THE INVENTION

This invention relates to wind turbines, which are commonly used as a means to generate electric power, particularly in areas remote from any other viable electric power generation source.

A number of wind turbine systems are known, some of which are in use. These fall into two broad types, depending primarily on the orientation of the turbine axis of rotation: the axis is either horizontal, or it is vertical. In both structures, the rotation of the wind turbine is transmitted to an electrical generating system to produce power. This invention is concerned with a wind turbine structure in which the wind turbine axis of rotation is essentially vertical.

In horizontal axis wind turbines, a rotatable blade system, which in appearance is often much like an aircraft propeller, is caused to rotate about horizontal axis, which is generally carried at the top of a suitable tower structure. The axis of rotation consequently is more or less in line with the wind direction. Exemplary arrangements of this type are described in EP 0 015 131 and in WO 97/39240. It has also been proposed to modify the horizontal wind turbine by changing the turbine axis to vertical, and providing a structure which will cause a flow of air over the wind turbine. The structure can be arranged to provide an air flow which can be either upward or downward in direction. Exemplary arrangements of this type are described in U.S. Pat. No. 4,017,205, U.S. Pat. No. 4,018,535, U.S. Pat. No. 4,036,916 and FR 2 588 317 (all upward air flow) and in U.S. Pat. No. 4,116,581 (downward air flow).

In true vertical axis wind turbines, a blade system is carried on a vertical axis of rotation which is substantially perpendicular to the wind direction. Several arrangements of this type are known, in which blade surfaces are attached to a suitable shaft, and static surfaces are used to direct the wind flow past the blade surfaces. Exemplary arrangements of this type are shown in U.S. Pat. No. 4,088,419, U.S. Pat. No. 4,156,580, U.S. Pat. No. 4,365,929 and JP 08 232 831. An alternative vertical axis wind turbine in which the blades are bow-shaped and attached only at their ends to a rotatable shaft is also known. Exemplary arrangements of this type, known as the Darrius type, are described in U.S. Pat. No. 1,835,018 and CA 1,151,072.

These known wind turbines suffer from a number of disadvantages. First, since the wind rarely always blows in the same direction, for most of these devices it is also necessary to provide a means to align the wind turbine with the wind: for example in EP 0 015 131 the whole structure can be rotated. The Darrius type does not have this limitation. Second, most of these devices, including the Darrius type, are not efficient in converting wind energy into available rotary energy to drive a generator. Third, at least in part due to their inefficiency, these turbines require a significant airflow in order to generate power, and do not operate under low wind speed conditions. As a further complication, even when there is sufficient wind velocity available, the Darrius type has to be started into rotation by a powering device, since it is not self starting. Fourth, all of these devices have a range of safe wind speeds: if the wind speed becomes too high the turbines simply run faster until damage occurs to the device unless steps are taken to both shut them down and lock the turbine to prevent it rotating. Additionally, apart from means to channel the wind flow through the turbine, no attention appears to have been paid at all to the air flow patterns around the turbines, and in particular to the air flow pattern down wind from the turbine.

This invention seeks to overcome at least some of these disadvantages by providing a vertical axis wind turbine structure which uses the available wind air flow more efficiently, which will respond to wind speeds below the operational limit for most known wind turbines, and which will disengage power transfer due to loss of the vortex if the wind speed becomes too high for safe operation. This invention seeks to control the air flow pattern down wind of a vertical turbine, in particular to provide a structure including a wind turbine which creates a vortex condition down wind of the turbine which enhances the air flow past the vertical turbine. In the vertical axis wind turbine structure of this invention, a rectangular shaped turbine with four orbiting panels is mounted to rotate at the top of a pyramidal base structure which generates a substantially horizontal vortex immediately down wind of the turbine, thus enhancing the air flow past the turbine. Hence by defeating an air flow pattern that is akin to an aerodynamic lift condition, a low pressure zone moving upwardly over the down wind face of the pyramidal base structure is combined with a high pressure zone near the apex of the pyramid to create the down wind vortex.

Thus in its broadest embodiment this invention seeks to provide a vertical axis wind turbine structure comprising in combination:

(a) a substantially square pyramidal base structure, having an apex and a base surface defining a substantially horizontal plane;

(b) a substantially triangular face joined to each of the four edges of the base surface and to the adjacent triangular faces;

(c) a turbine structure constructed and arranged to rotate about a vertical axis; and (d) means to utilise the rotation of the turbine to provide useful work; wherein:

(i) the four edges of the base surface are the same length;

(ii) the four triangular faces are inclined at the same included angle to the base surface;

(iii) the included angle between each of the triangular faces and the base surface is from 45° to 55°;

(iv) the turbine structure extends upwardly from the apex of the pyramid;

(v) the turbine contains four elongate wind panels formed in two parts, each of which is attached along a first elongate edge to the turbine axis and along a second elongate edge to the second part; and (vi) the two parts of each elongate wind panel are joined into an L-shaped cross-section, in which the two arms are of substantially the same width.

Preferably, the included angle between each of the four triangular faces and the base surface is about 50°. More preferably, the included angle between each of the four triangular faces and the base surface is from 49°30' to 52°30'.

Preferably, the four triangular faces are flat. More preferably, each of the four triangular faces is creased inwardly on a line from the pyramid apex to the midpoint of the base surface edge, and the crease angle is from about 1° to about 2°. Most preferably, each of the four triangular faces is creased inwardly on a line from the pyramid apex to the midpoint of the base surface edge, and the crease angle is about 1°30'.

The invention will now be described with reference to the embodiment shown in the attached schematic drawings in which.

Figure 1:
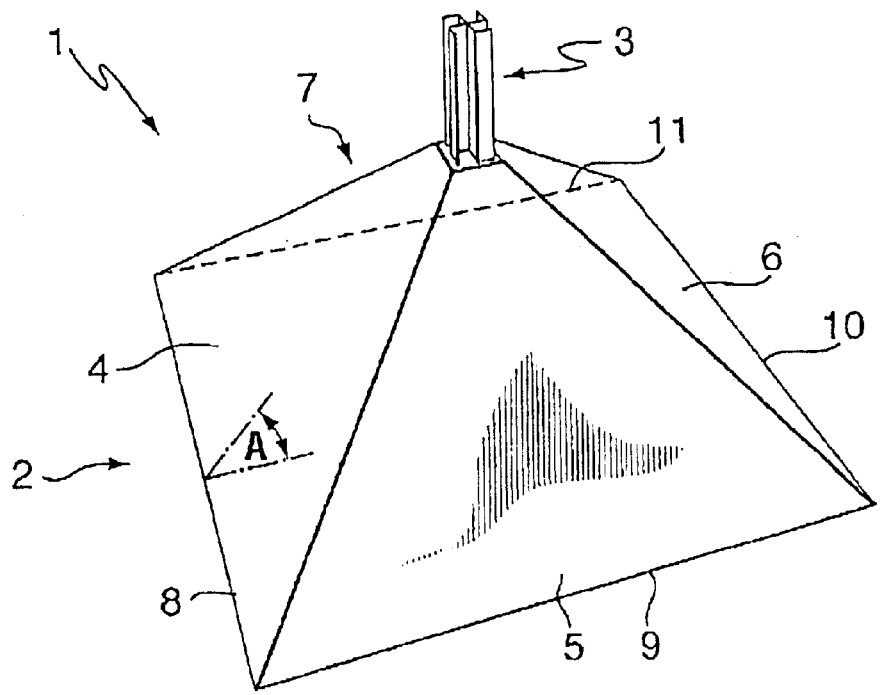
FIGS. 1 and 2 show the turbine and pyramid.
Figure 3:
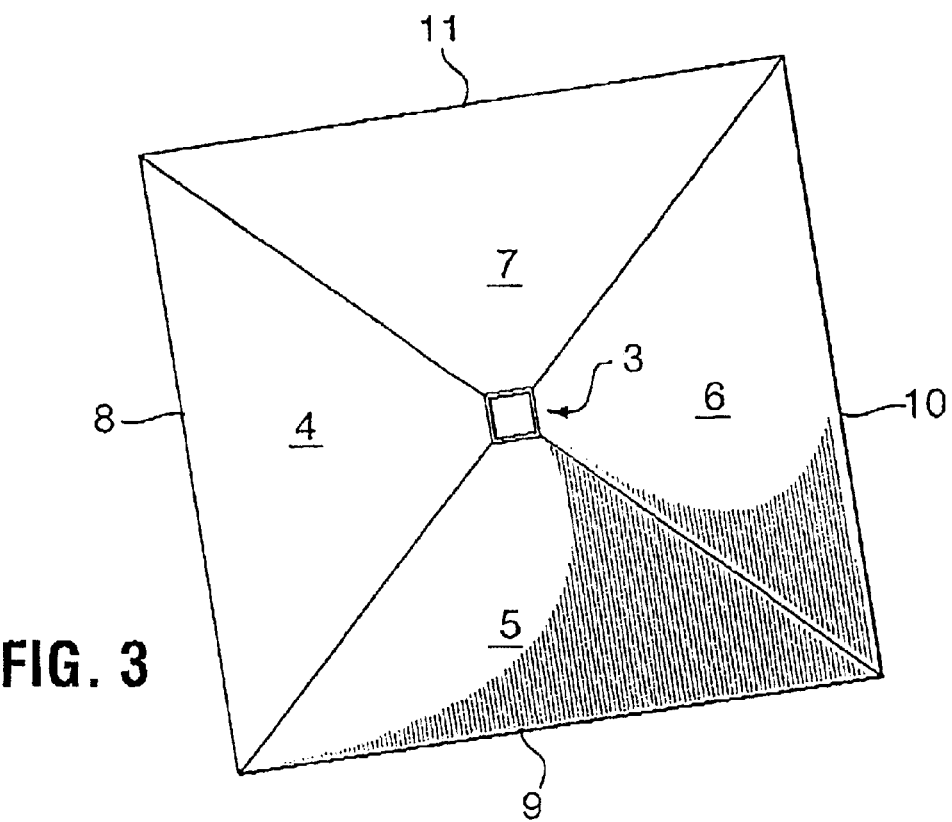
FIGS. 3 and 4 show top views of the pyramidal base structures of FIGS. 1 and 2.

Referring first to FIGS. 1 and 3, the wind turbine structure 1 comprises essentially two units: a pyramidal base structure 2, and a wind turbine 3 mounted at its apex. The details of the mounting for the wind turbine are not shown, nor is the drive means for transmitting the rotational energy developed by the turbine to an electrical generator. Conventional techniques are used for the turbine rotary mounting. The electrical generator will generally be housed within the pyramidal base structure.

The pyramidal base structure has four triangular faces 4, 5, 6 and 7 which are each joined to one of the four edges of the base surface edges 8, 9, 10 and 11. The included angle between each of the four faces and the base surface, as shown at A for the face 4, is the same. Its value will be discussed below.

Figure 2:
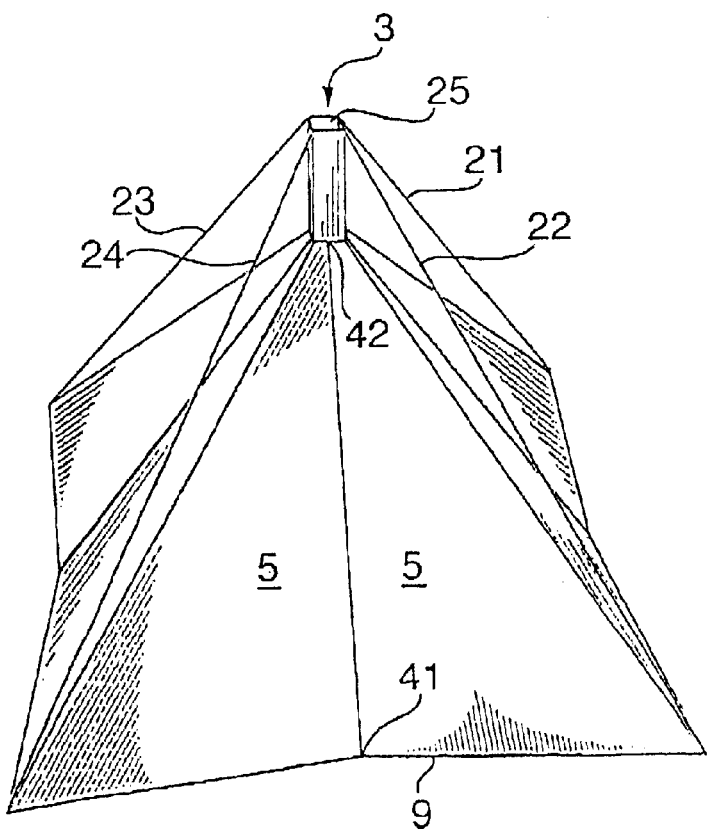

The turbine structure 3 will normally require that some form of stabilisation can also be used. In FIG. 2 suitable anchor wires 21, 22, 23 and 24 are shown attached to the top 25 of the turbine unit. Other forms of the same arrangement can be used in the structure of FIG. 1.

Figure 4:
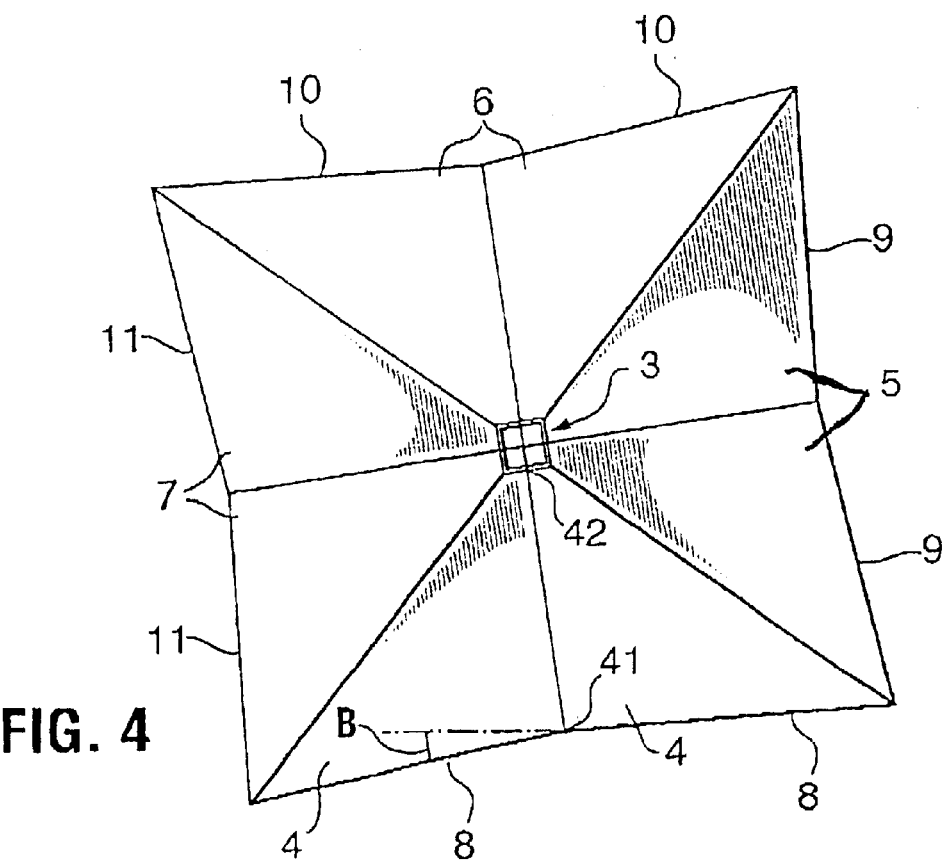

FIGS. 2 and 4 show an alternative pyramidal base structure. In this structure, each of the four faces 4, 5, 6 and 7 of the pyramidal base structure are again the same size, but instead of being flat, they are creased. The crease in each face extends from the midpoint of the side of the base surface, as at 41, essentially to the apex of the pyramidal structure, as at 42. In FIGS. 2 and 4 the crease angle has been exaggerated for clarity. In practise, the crease angle B is small, and, as is discussed below in more detail, is less than about 2°, so that the included angle between the two parts of the face taken perpendicular to the crease line is at lease 178°. The edges 8, 9, 10 and 11 of the base surface also follow the creased shape of the four triangular faces.

Figure 5:
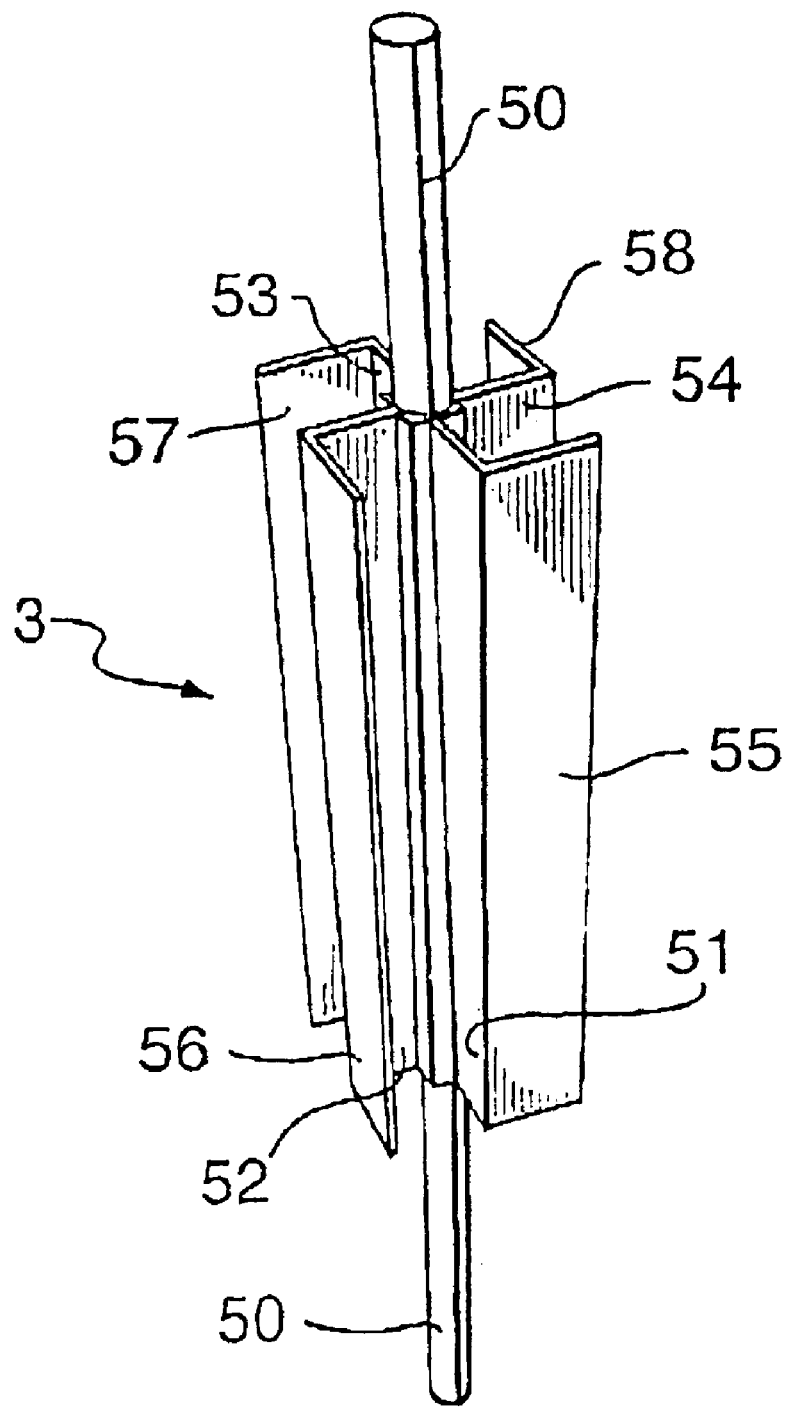
FIG. 5 shows the turbine.

FIG. 5 shows in more detail the components of the wind turbine 3. The turbine includes a central shaft 50 which is carried at both ends in suitable conventional bearings. A conventional drive train for the electrical generator is also connected to the lower end. It is also understood that the shaft 50 can be carried on a smaller static central shaft. The electrical generation equipment can be conveniently housed within the pyramidal base 2. The shaft 50 carries four orbital wind panels each of which includes an inner and an outer part joined together into wind panels having L-shaped cross section. The inner parts 51, 52, 53 and 54 are each attached at a first long edge to the shaft 50, and to the second parts 55, 56, 57 and 58 at a second long edge. The included angle between each pair of parts is discussed below, and is at most 90°.

The wind turbine of this invention operates by creating a vortex in the wind in the space immediately downwind of the wind turbine structure. This is achieved by configuring the pyramidal base as an aerodynamic lift device, and then defeating the generated lift to create a large low pressure cavity down wind of the base and turbine. To achieve this effect, the shape of the pyramidal base structure and of the wind panels are critical. In order to generate adequate lift effects, the angle A of the faces of the pyramid to the base surface—which will be generally horizontal thus locating the turbine on an essentially vertical axis—has to be carefully controlled. It should be between 45° and 55°, and preferably is about 50°, and within the range of 49° 30' to 52° 30'. Since the vortex forms on the down wind face of the pyramidal base structure, it is preferred to use a creased face.

The crease angle, expressed as the angle B, is small in the range of from 1° to 2°, and is preferably close to 1° 30'. The crease both aids in vortex formation, and provides a track which the vortex can follow, thus improving air flow past the apex area of the pyramidal structure. The vortex catches the four orbiting wind panels of the turbine, thus providing rotational energy in the turbine shaft.

This configuration has two unexpected results. First, the range of useable wind velocities is extended, particularly into a lower wind speed range than is presently useable. Second, if the wind speed increases to a potentially unsafe level, the vortex breaks up, and detaches itself from the structure. The turbine load can be decreased or disengaged, thus allowing the downwind vortex to detach itself from the turbine structure and move further downwind, when surrounding air will satisfy the low pressure zone in the vortex. This releases the turbine, and allows it to rotate in an inefficient drag configuration.

We claim:

1. A vertical axis wind turbine structure comprising in combination:
   (a) a substantially square pyramidal base structure, having an apex and a base surface defining a substantially horizontal plane;
   (b) a substantially triangular face joined to each of the four edges of the base surface and to the adjacent triangular faces;
   (c) a turbine structure constructed and arranged to rotate about a vertical axis; and
   (d) means to utilise the rotation of the turbine to provide useful work;
   wherein:
   (i) the four edges of the base surface are the same length;
   (ii) the four triangular faces are inclined at the same included angle to the base surface;
   (iii) the included angle between each of the four triangular faces and the base surface is from 45° to 55°;
   (iv) the turbine structure extends upwardly from the apex of the pyramid;
   (v) the turbine contains four elongate wind panels formed in two parts, each of which is attached along a first elongate edge to the turbine axis and along a second elongate edge to the second part; and
   (vi) the two parts of each elongate wind panel are joined into an L-shaped cross-section, in which the two arms are of substantially the same width.

2. A vertical axis wind turbine structure according to claim 1 wherein the included angle between each of the four triangular faces and the base surface is about 50°.

3. A vertical axis wind turbine structure according to claim 2 wherein the included angle between each of the four triangular faces and the base surface is from 49°30' to 52°30'.

4. A vertical axis wind turbine structure according to claim 1 wherein the four triangular faces are flat.

5. A vertical axis wind turbine structure according to claim 1 wherein each of the four triangular faces is creased inwardly on a line from the pyramid apex to the midpoint of the base surface edge, and the crease angle is from about 1° to about 2° is about 1°30'.

6. A vertical axis wind turbine structure according to claim 1 wherein each of the four triangular faces is creased inwardly on a line from the pyramid apex to the midpoint of the base surface edge, and the crease angle is about 1°30'.

* * * * *